Aug. 11, 1953 J. VANI ET AL 2,648,342
CAR WASHING APPARATUS OF THE LIQUID-SPRAY TYPE
Filed March 28, 1950 3 Sheets-Sheet 1

INVENTORS
JAMES VANI
ALBERT J. MALPEDE
BY *Wallace and Cannon*
ATTORNEYS

Aug. 11, 1953  J. VANI ET AL  2,648,342
CAR WASHING APPARATUS OF THE LIQUID-SPRAY TYPE
Filed March 28, 1950  3 Sheets-Sheet 3

INVENTORS
JAMES VANI
ALBERT J. MALPEDE
BY Wallace and Cannon
ATTORNEYS

Patented Aug. 11, 1953

2,648,342

UNITED STATES PATENT OFFICE 2,648,342

CAR WASHING APPARATUS OF THE LIQUID-SPRAY TYPE

James Vani and Albert J. Malpede, Chicago, Ill., assignors to Washmobile Corporation, Beverly Hills, Calif., a corporation of California Application March 28, 1950, Serial No. 152,358

4 Claims. (Cl. 134—93)

This invention relates to vehicle washers and more particularly to vehicle washers of the type that are adapted to move back and forth across vehicles to be washed and to direct a plurality of sprays of liquid against the vehicles during such movement.

A primary object of our invention is to provide a novel vehicle washer of the general type shown in the Hopper and Drake, United States Patent No. 2,465,562, granted March 29, 1949, and embodying novel improvements thereover.

Another object is to provide a novel vehicle washer of the aforementioned type embodying spraying devices, cleansing agent-supplying means, and liquid pumping means constituted and arranged in a novel and expeditious manner to afford a novel, integral unit for quickly, easily and efficiently washing and rinsing a vehicle.

A further object of our invention is to enable a vehicle washer of the aforementioned type to be constructed which may be quickly and easily assembled; does not require auxiliary pumping units; may be readily handled and controlled by one man who is not required to leave the operating position to effect the control operations; may be efficiently and economically produced commercially; and is constructed, and is operable in a novel and expeditious manner.

Other and further objects of the present invention will be apparent from the following description and claims and are illustrated in the accompanying drawings which, by way of illustration, show a preferred embodiment of the present invention and the principles thereof and what we now consider to be the best mode in which we have contemplated applying these principles. Other embodiments of the invention embodying the same or equivalent principles may be used and structural changes may be made as desired by those skilled in the art without departing from the present invention and the purview of the appended claims.

In the drawings:

Fig. 8 is a detail sectional view taken substantially along the line 8—8 in Fig. 3, and with certain parts broken away to show the interior of the valve illustrated therein.

Figure 1:
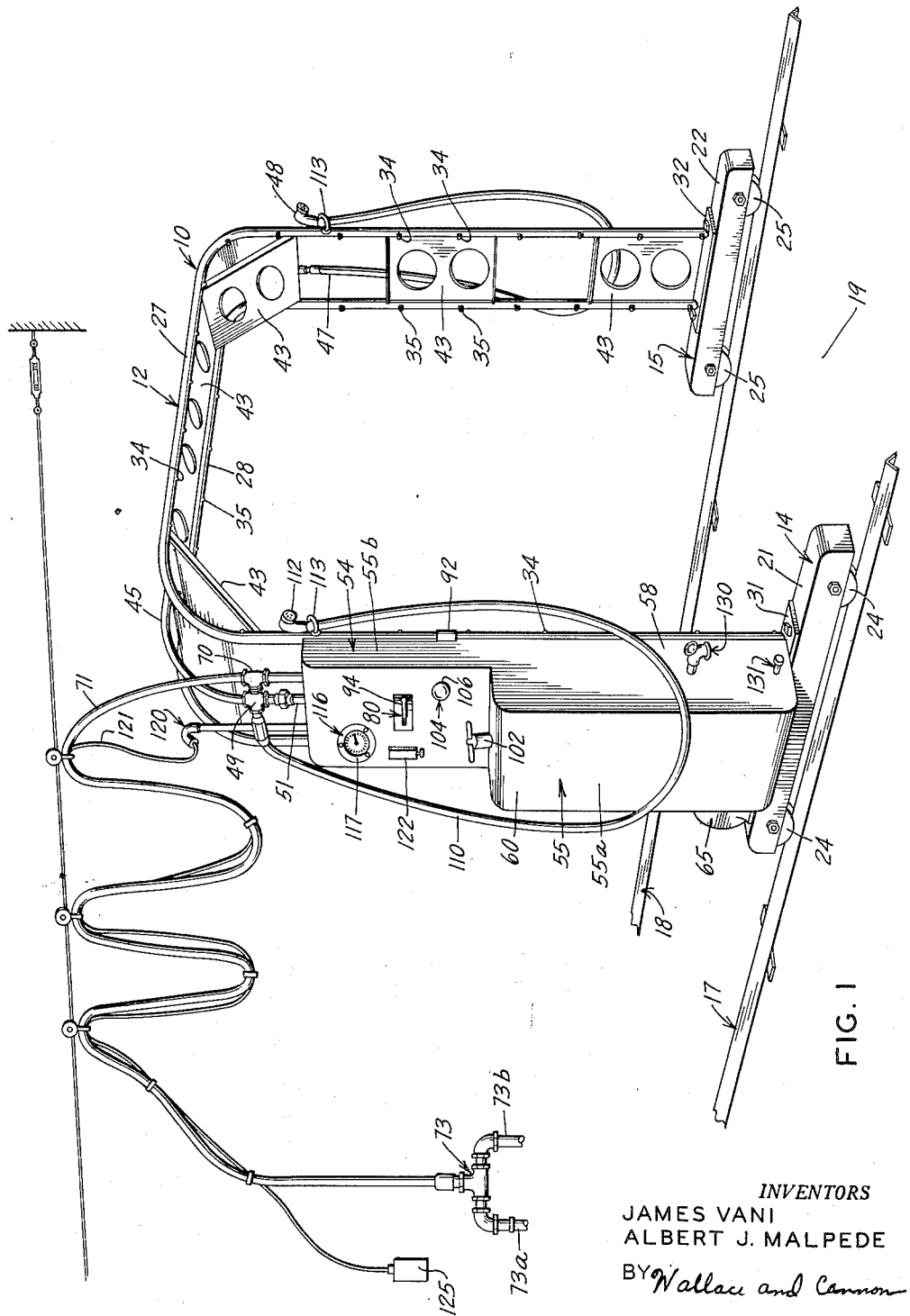
Fig. 1 is a perspective view of a vehicle washer embodying the principles of our invention.

For the purpose of illustrating the principles of our invention, a vehicle washer 10, comprising a preferred embodiment of our invention, is shown in the drawings which comprises, in general, a substantially arch-shaped frame 12 mounted by means of carriages 14 and 15 on tracks or guide rails 17 and 18.

Figure 2:
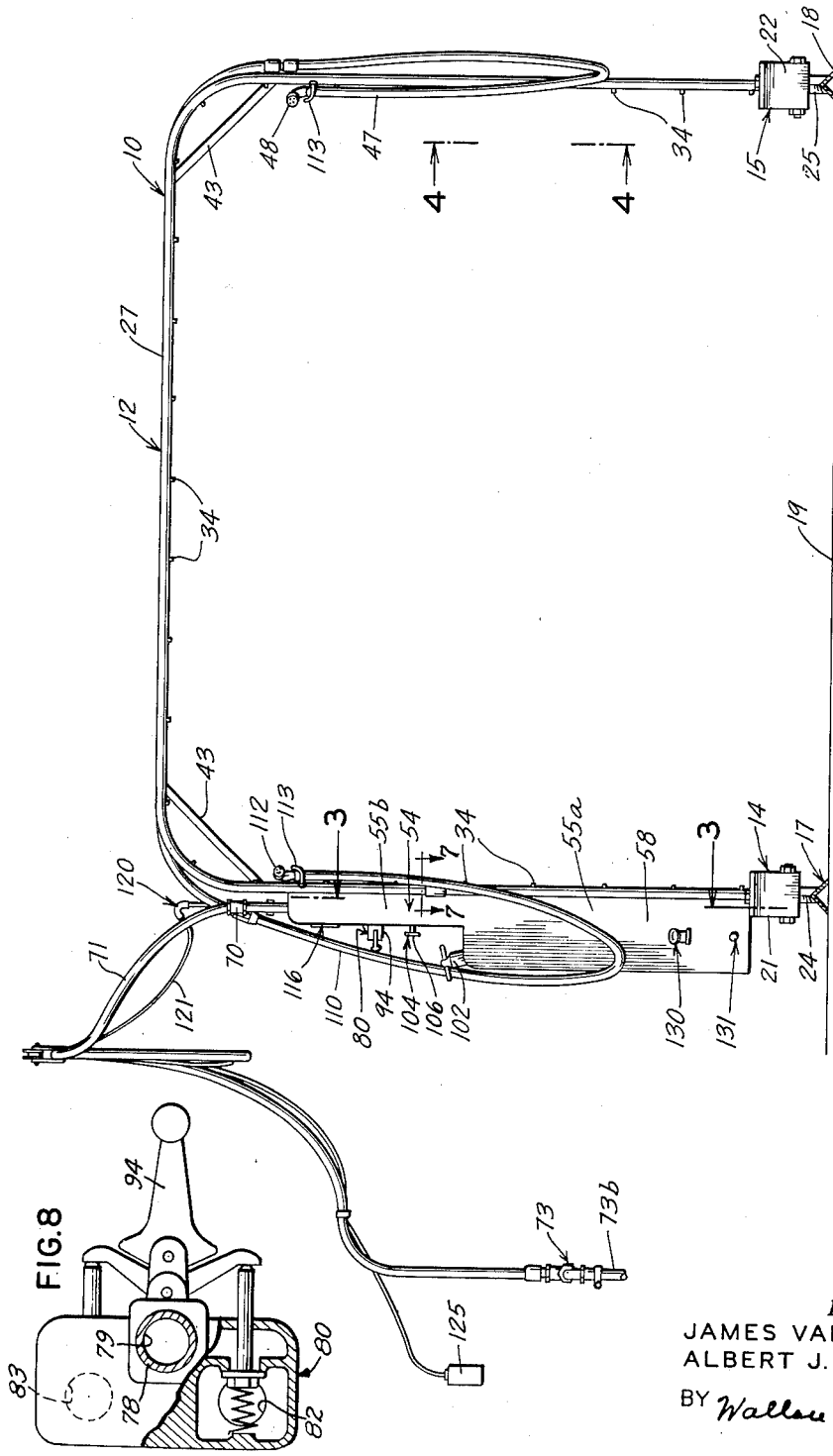
Fig. 2 is a side elevational view of the device shown in Fig. 1.

The tracks 17 and 18, which may be of any suitable form, such as, for example, the elongated inverted V-shaped members shown in Figs. 1 and 2, are mounted on a suitable supporting base 19 such as the floor of a garage, or the like, in parallel spaced relation to each other. The spacing of the tracks 17 and 18 is such that the vehicle to be washed may be disposed in longitudinally extending, parallel relation therebetween, in position wherein the frame 12 may be moved back and forth across the vehicle, longitudinally thereof, on the tracks 17 and 18 during a vehicle washing operation, as will be discussed in greater detail presently.

The carriages 14 and 15 comprise body members 21 and 22 having wheels 24 and 25, respectively, mounted on the tracks 17 and 18, respectively. The wheels 24 and 25 as best seen in Fig. 1, are suitably flanged for guided engagement with the tracks 17 and 18, whereby the carriages 14 and 15 may be rolled back and forth longitudinally of the tracks 17 and 18.

The frame 12 includes two arch-shaped or, substantially inverted U-shaped, pipes or conduits 27 and 28 disposed in parallel spaced relation on the carriages 14 and 15, in spanning relation therebetween. The lower end portions of the pipes 27 and 28 are attached to suitable mounting plates 31 and 32 mounted on the bodies 21 and 22 of the carriages 14 and 15.

Figure 5:
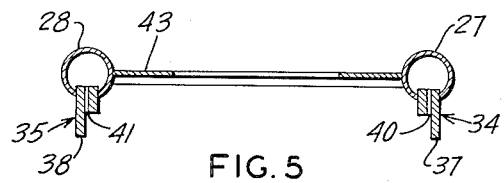
Fig. 5 is a detail sectional view taken substantially on the line 5—5 in Fig. 4.
Figure 6:
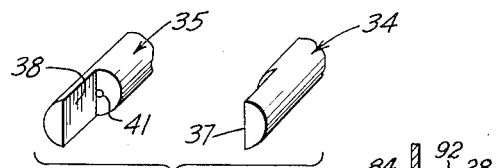
Fig. 6 is a front, detail perspective view of nozzles shown in Figs. 4 and 5.
Figure 7:
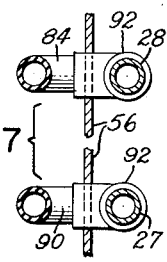
Fig. 7 is a detail sectional view taken substantially along the line 7—7 in Fig. 2.

A plurality of spray nozzles 34 and 35 are mounted in the side walls of the pipes 27 and 28 in spaced relation longitudinally therealong, and are directed inwardly toward the center of the arch formed by the frame 12. The nozzles 34 and 35 may be of any suitable type but are preferably of the type shown in the drawings, Figs. 5 and 6 and which embody substantially flat deflector wings or plates 37 and 38 disposed outwardly adjacent to, and substantially parallel to, jets or orifices 40 and 41, respectively.

The pipes 27 and 28 are held in parallel spaced relation to each other by suitable braces such as panel members 43 mounted between the pipes 27 and 28 and welded thereto.

A third pipe 45 having substantially the same shape as the upper end portions of the pipes 27 and 28, Fig. 1, is mounted on the upper end portion of the frame 12 in parallel spaced relation between the pipes 27 and 28, for a purpose which will be discussed in greater detail presently. The pipe 45 rests upon the panels 43 at the top of the arch 12 and may be secured thereto by welding and is considerably shorter than the pipes 27 and 28, having one end connected by a flexible hose 47 to a spray nozzle 48, and having the other end thereof connected by a cross-fitting 49 mounted on a pipe 51 projecting upwardly through the top wall 53 of a housing 54 mounted on the carriage 14, adjacent to and extending between the legs of the pipes 27 and 28 that project upwardly from the carriage 14.

Figure 3:
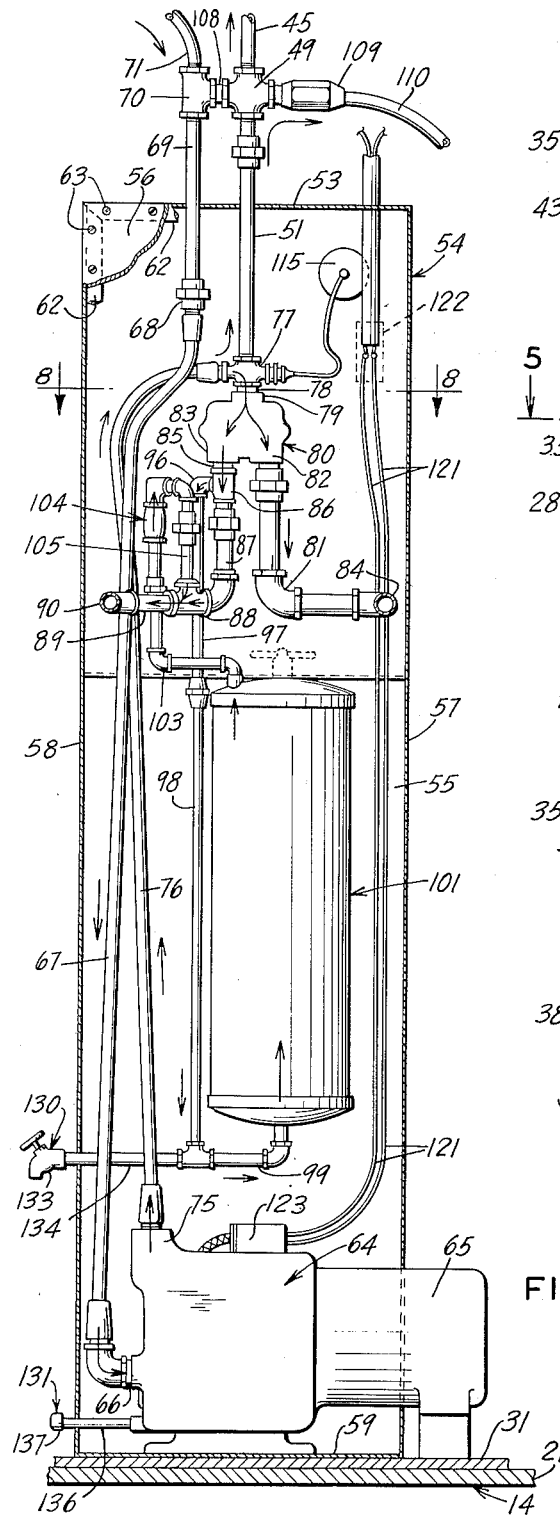
Fig. 3 is a fragmentary sectional view looking in the direction of the arrows 3—3 in Fig. 2.
Figure 4:
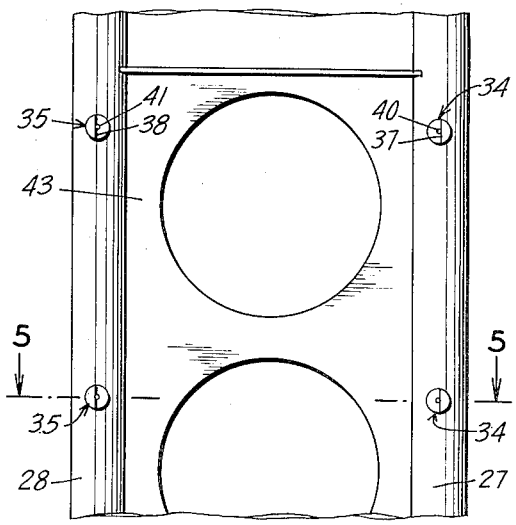
Fig. 4 is an enlarged detail elevational view of a portion of the device shown in Fig. 1, looking in the direction of the arrows 4—4 in Fig. 2.

The housing 54, Figs. 1 and 3, comprises a shell 55 mounted on a substantially rectangular shaped rear wall or plate 56, Fig. 3, the shell 55 comprising side walls 57 and 58, a bottom wall 59, a front wall 60, and the aforementioned top wall 53, the side walls 57 and 58, the top wall 53 and the bottom wall 59 having suitably inwardly turned flanges 62 to which the rear wall 56 may be secured by suitable means such as screws 63, Fig. 3. As is best seen in Figs. 1 and 2 the shell 55 of the housing 54 is substantially L-shaped in cross-section having an enlarged lower portion 55a and a narrower or restricted upper portion 55b. The housing 54, as will be discussed in greater detail presently comprises a combination control panel and casing for integral parts of our novel vehicle washer 10.

A water pump 64 powered by a suitable unit such as the motor 65 is mounted on the bottom wall 59 of the housing 54, on top of the carriage 14, Fig. 3. The inlet 66 of the pump 64 is connected to the lower end portion of a pipe 67 projecting upwardly therefrom within the housing 54. The upper end portion of the pipe 67 is connected by a coupling 68 to a pipe 69 which projects upwardly through the top wall 53 of the housing 54 and is connected by a T-fitting 70 to a flexible hose or conduit 71 which, in turn, is connected to a suitable source of water, such as the usual plumbing fixtures 73 to be found in present day buildings wherein our novel device will be used and including the usual cold water pipes 73a and hot water pipes 73b controlled by valves not shown.

The outlet 75 of the pump 64 is connected to the lower end of a pipe 76 which projects upwardly in the housing 54 and is connected at its upper end portion to a cross-fitting 77 having one arm connected by a nipple 78 to the inlet 97 of a three-way valve 80 mounted on the front wall 60 of the housing 54. The control valve 80 includes two outlets 82 and 83 one of which, namely, the outlet 82 is connected by suitable coupling members 81 to a pipe 84 which projects outwardly through the rear wall 56 of the housing 54. The other outlet 83 of the valve 80 is connected by a nipple 85 to a T-fitting 86. One leg of the T-fitting 86 is connected by a suitable coupling member 87 to one leg of a T-fitting 88, one leg of which latter T-fitting 88 is connected by suitable coupling members 89 to a pipe 90 which, like the pipe 84 projects outwardly through the rear wall 56 of the housing 54. The pipes 84 and 90 are connected by suitable respective couplings, such as the T-fitting 92 shown in Fig. 1, to the legs of the pipes 28 and 27, respectively, disposed adjacent to the housing 54.

The control valve 80 embodies a handle 94 which projects outwardly through the front wall 60 of the housing 54 and affords means for manually and selectively controlling the flow of water from the inlet 79 of the valve 80 outwardly through the outlets 82 and 83, and, therefore, it will be seen affords means for selectively controlling the flow of liquid from the valve 80 into the pipes 27 and 28. It will be remembered that the outlet 82 of the control valve 80 is directly connected through the coupling members 81 and the pipe 84 to the pipe 28, and that the outlet 83 of the valve 80 is connected through the T-fitting 86, the coupling 87, the T-fitting 88, the coupling 89, and the pipe 90 to the pipe 27, and therefore, it will be seen that means are afforded for feeding liquid from the outlet 75 of the pump 64 through the pipe 76, the cross-fitting 77 and the valve 80 directly into the pipes 27 and 28. However, as is best seen in Fig. 3 the T-fitting 86, in addition to the legs connected to the nipple 85 and the couplings 87, has a third leg which is connected by an elbow fitting 96 to the upper end portion of a pipe 97 mounted in the housing 54, and the lower end portion of which is connected by a pipe 98 and suitable couplings 99 to the lower end portion of an elongated tank or container 101. The upper end portion of the tank 101 is connected by a suitable couplings 103 to the inlet of a metering valve 104 mounted on the front wall 60 of the housing 54. The outlet of the metering valve 104 is connected by suitable couplings 105 to the third leg of the T-fitting 88. The metering valve 104 embodies the customary handle 106 by means of which the flow of fluid through the metering valve 104 may be controlled, the handle 106 projecting outwardly from the front wall 60 of the housing 54, Fig. 1. Thus, it will be seen that when liquid is being fed from the pump 64 through the outlet 83 of the valve 80, a portion of the liquid discharged from the outlet 83 of the valve 80 is fed directly through the T-fitting 86, the couplings 87 the T-fitting 88 and the pipe 90 into the pipe 27, but that another portion of the liquid discharged from the outlet 83 of the valve 80 passes through the elbow fitting 96, the pipes 97 and 98, the couplings 99, the tank 101, the couplings 103, the metering valve 104 and the couplings 105 into the T-fitting 88 where it mixes with the liquid fed directly from the outlet 83 of the valve 80 through the couplings 87 to the T-fitting 88, and is then discharged with this liquid through the pipe 90 into the pipe 27.

During the normal operation of our novel device 10, a supply of a suitable saponaceous agent or cleansing agent, such as soap or a detergent, is contained in the tank 101 whereby the liquid passing upwardly through the tank 101 from the T-fitting 86 into the T-fitting 88, picks up a supply of saponaceous agent and forms a solution therewith which is mixed with the liquid fed directly to the T-fitting 88 through the coupling 87 from the outlet 83 of the valve 80, and, therefore, the liquid discharged through the pipe 90 into the pipe 27 does not comprise pure water but is a cleansing solution having a suitable saponaceous agent such as soap or a detergent in solution in the water. A removable inlet cover or cap 102 is mounted on the upper end of the tank 101 and projects upwardly from the top wall of the enlarged portion 55a of the shell 55 to afford ready access to the interior of the tank 101 for replenishing the supply of saponaceous agent or cleansing agent therein as necessary.

Thus, it will be seen that a suitable cleansing solution and a suitable rinsing liquid may be selectively fed from the pump 64 through the pipes 27 and 28, respectively, and thus discharged outwardly through the spray nozzles 34 and 35, all the parts including the pump 64 necessary for such feeding of the cleaning solution and rinsing liquid from the supply source being embodied in our novel vehicle washer 10 and movable therewith.

The upper leg of the cross-fitting 77 which T-fitting, it will be remembered, is connected by a nipple 78 to the inlet 79 of the control valve 80, is connected to the lower end portion of the pipe 51 to which the pipe 45 is connected by the cross-fitting 49. A third leg of the cross-fitting 49 is connected by a solid bar or nipple 108 to the T-fitting 70, this latter connection not being for the purpose of feeding liquid directly between the cross-fitting 49 and the T-fitting 70 but merely comprising means whereby the two T-fittings 49 and 70 support and brace each other.

The fourth leg of the cross-fitting 49 is connected by a suitable coupling 109 and a flexible hose 110 to a spray nozzle 112 which is similar to the spray nozzle 48. The two spray nozzles 48 and 112 afford manually operable means for washing portions of a vehicle such as, for example, the wheels and the undersides of the fenders which are difficult to get at, and when not in use may be supported on the frame 12 by hanging them on suitable means, such as brackets 113.

The fourth leg of the cross-fitting 77 is connected by a suitable tube 115 to a pressure gage 116 mounted in the front wall 69 of the housing 54 in position wherein the face 117 of the pressure gage 116 is clearly visible to an operator standing adjacent to the front wall 69 of the housing 54.

A conduit 120 having wires 121 extending therethrough, Figs. 1 and 3, is mounted in and extends through the top wall 53 of the housing 54, and the wires 121 are connected at one end through a water-proof switch 122 mounted on the front wall 69 of the housing 54 to the switch box 123 of the motor 65 and the other ends thereof are connected to a suitable source of electric power such as, for example, the customary commercial electrical outlet or fuse box 125.

From the foregoing, it will be seen that an operator standing in front of the housing 54 is within easy reach of all the controls of our novel device, including, the switch 122 for controlling the operation of the motor 65 and the pump 64; the handle 94 of the valve 80, for controlling the flow of cleansing fluid or rinsing fluid through the pipes 27 and 28, respectively; and the handle 106 of the metering valve 104 to thereby control the quantity of saponaceous agent or cleansing agent flowing from the tank 101 into the T-fitting 88; and is strategically positioned for readily viewing the dial 117 of the pressure gage 116, and for readily refilling the tank 101 through the cover 102.

Also, it will be seen that the outwardly projecting lower end portion 55a of the housing 54 affords a readily grasped handle for the housing 54, and the vehicle washer 10 is readily movable on the carriages 14 and 15 along the tracks 17 and 18, whereby a single operator, by grasping this outwardly projecting portion 55a of the housing 54 while standing in front thereof, may easily move the vehicle washer 60 back and forth longitudinally of the tracks 17 and 18, and is efficiently protected from the spray and spatter of liquid discharged from the nozzles 34 and 35 against the side walls of a vehicle disposed within the outline of the frame 12. In addition, it will be seen that in our novel device 10, the various working parts of the device, and even including the pump 64, is embodied in the device as an integral part thereof which is movable therewith.

Suitable drains 130 and 131 for the tank 101 and the pump 64 are mounted in the housing 54 and project outwardly through the side wall 58 thereof, Figs. 1 and 3. The drain 130 comprises a faucet or valve 133 connected to the lower end portion of the pipe 98 and the coupling members 99 by a pipe 134. The drain 131 comprises a pipe 136 having one end connected to the lower end portion of the pump 64, and having the other end extending outwardly through the side wall 58 of the housing 54, this latter end being normally closed by a removable cap 137 mounted thereon and threadedly engaged therewith.

In a normal operation of our novel vehicle washer 10, a vehicle is driven between the tracks 17 and 18 and the vehicle washer 10 is disposed across one end thereof. The operator then shifts the handle 94 of the valve 80 to the position wherein the outlet 83 of the valve 80 is closed and the outlet 82 of the valve 80 is opened. Thereafter, the operator trips the switch 122 to energize the motor 65 and drive the pump 64 which effects pressure feeding of rinsing liquid from the outlet 75 of the pump 64 through the valve 80 into the pipe 28, from which it is discharged in spray form from the nozzles 35 downwardly and laterally onto the outer surface of the automobile positioned within the outline of the frame 12. After moving the vehicle washer 10 across the full length of the vehicle to be washed, and thereby wetting the entire exposed top and side surfaces of the vehicle with rinsing liquid, the operator may move the handle 94 of the valve 80 to the position wherein the outlet 82 is closed and the outlet 83 is opened to stop the feeding of liquid from the pump 64 through the pipe 28 and the nozzles 35, and initiate the feeding of liquid from the pump 64 through the pipe 27 and the nozzles 34. The operator may then turn the handle 106 of the metering valve 104 to the position wherein the proper strength cleansing solution is being fed from the nozzles 34, and the vehicle washer 10 may then be moved by the operator longitudinally along the vehicle in the other direction to spray the entire exposed top and side surfaces of the vehicle with a cleaning solution to wash off dirt, grease and like foreign material. Upon reaching the other end of the vehicle with the vehicle washer 10, the operator may move the handle 94 into position to close the outlet 83 of the valve 80 and open the outlet 82 thereof to thereby direct clear rinsing liquid or water from the pump 64 through the valve 80 into the pipe 28 and thence outwardly through the nozzles 35. The vehicle washer 10 may then be rolled longitudinally along the automobile in the first direction to rinse the cleansing agent from the outer surface thereof. If desired, during the aforementioned cleaning and rinsing of the body of the automobile, the manually operable nozzles 112 and 48 may be used by other attendants to wash the more difficultly accessible portions, such as, for example, the wheels, and the underside of the fenders, and the like.

From the foregoing, it will be seen that we have afforded a novel vehicle washer wherein the various parts thereof are embodied in a single unit as an integral part thereof and wherein these parts are constituted and arranged in a novel and expeditious manner which provides ready control of the units to the operator and which affords a compact, efficient device which may be economically manufactured.

Thus, while we have illustrated and described the preferred embodiment of our invention, it is to be understood that this is capable of variation and modification, and we therefore do not wish to be limited to the precise details set forth, but desire to avail ourselves of such changes and alterations as fall within the purview of the following claims.

We claim:
1. A vehicle washer comprising two substantially arch-shaped conduits mounted in upright parallel spaced relation to each other, each of said conduits comprising two upright legs and a cross-bar interconnecting the upper end portions of said legs, a plurality of spray nozzles mounted in said conduits in spaced relation therealong, said nozzles on each of said legs being directed toward the other leg of the respective arch-shaped conduit, and said nozzles on each of said cross-bars being directed downwardly, means including wheels mounted on the lower end portion of said legs for movably supporting said conduits for movement as a unit, and means for selectively feeding saponified liquid and rinsing liquid through respective ones of said conduits to said nozzles for discharge therefrom, said means comprising a pump mounted between and carried by two of said legs, conduit means for feeding liquid to said pump, and other conduit means operatively connected between said pump and said conduits for feeding liquid under pressure from said pump to said conduits, said other conduit means comprising a saponaceous agent-container, a by-pass conduit connected around said container, and valve means for selectively controlling the flow of liquid from said pump through said container and said by-pass conduit.

2. In a vehicle washer, two elongated track members disposed in parallel spaced relation to each other, two carriages mounted on said tracks, each of said carriages being mounted on a respective one of said tracks for reciprocation longitudinally thereof, a substantially arch-shaped frame mounted in upright position on said carriages and extending therebetween for movement therewith along said tracks, said tracks, said carriages and said frame being of such a size and so positioned relative to each other that a vehicle to be washed may be placed between said tracks in longitudinally extending parallel relation thereto and said frame may be moved back and forth across said vehicle in spaced relation thereto during movement of said frame with said carriages during reciprocation of the latter along said tracks, said frame including two substantially U-shaped conduits disposed in inverted parallel relation to each other on said carriages for spraying liquid on such a vehicle during such a movement of said frame thereover, and means mounted on and movable with one of said carriages for selectively feeding rinsing liquid and cleaning liquid to respective ones of said conduits, said means comprising a pump for feeding liquid under pressure, two conduit means, each of said two conduit means being connected to a respective one of said conduits, one of said two conduit means including a saponaceous agent-container, a valve operatively connected between said two conduit means and said pump for selectively feeding liquid from said pump into said two conduit means, and means for feeding liquid to said pump.

3. In a vehicle washer, two elongated track members disposed in parallel spaced relation to each other, two carriages mounted on said tracks, each of said carriages being mounted on a respective one of said tracks for reciprocation longitudinally thereof, a substantially arch-shaped frame mounted in upright position on said carriages and extending therebetween for movement therewith along said tracks, said tracks, said carriages and said frame being of such a size and so positioned relative to each other that a vehicle to be washed may be placed between said tracks in longitudinally extending parallel relation thereto and said frame may be moved back and forth across said vehicle in spaced relation thereto during movement of said frame with said carriages during reciprocation of the latter along said tracks, said frame including three substantially U-shaped conduits disposed in inverted parallel relation to each other on said carriages, spray nozzles mounted on said conduits for spraying liquid onto such a vehicle during such a movement of said frame thereover, said spray nozzles being mounted in the sides of two of said conduits and being mounted on the ends of the other one of said conduits, and means mounted on and carried by one of said carriages for movement therewith for feeding liquid under pressure through said conduits for discharge from said nozzles, said means comprising a liquid pump mounted on said one carriage and movable therewith and having a liquid inlet and a liquid outlet, and conduit means operatively connected to said outlet of said pump and to said three conduits, said conduit means comprising a valve, and three branches, one of said branches being connected to said valve and one of said two conduits, another of said branches including a saponaceous agent-container and being connected to said one branch for feeding a cleansing agent into liquid passing through said one branch, and a third branch connected to said valve and the other of said two conduits, said valve being adjustable for selectively controlling the passage of liquid through said one branch and said third branch from said pump into said two conduits.

4. In a vehicle washer of the type including an arch-shaped frame for movement back and forth across a vehicle to be washed, said frame including two substantially U-shaped conduits mounted in inverted position in parallel relation to each other on said frame for feeding liquid onto such a vehicle during said movement of said frame, the combination of a liquid pump mounted on said frame and movable therewith, said pump having an inlet and an outlet, a supply conduit connected to one of said U-shaped conduits, another supply conduit connected to the other of said U-shaped conduits, said other supply conduit comprising two branch conduits connected in parallel, one of said branch conduits including a saponaceous agent-container for feeding a cleaning agent into liquid passing through said other supply conduit, and conduit means including a valve member operatively connecting said outlet of said pump to said supply conduits, said valve member being operative to selectively control the feeding of liquid from said outlet of said pump into respective ones of said supply conduits.

JAMES VANI.
ALBERT J. MALPEDE.

References Cited in the file of this patent

UNITED STATES PATENTS

| Number | Name | Date |
|---|---|---|
| 883,132 | Goff | Mar. 24, 1908 |
| 1,680,796 | Lostetter | Aug. 14, 1928 |
| 1,897,821 | Poli | Feb. 14, 1933 |
| 2,372,205 | Hertz | Mar. 27, 1945 |
| 2,465,562 | Hopper et al. | Mar. 29, 1949 |
| 2,475,676 | Ralph | July 12, 1949 |